United States Patent
Maeto

(10) Patent No.: US 10,580,445 B1
(45) Date of Patent: Mar. 3, 2020

(54) MAGNETIC HEAD AND DISK DEVICE WITH THE SAME

(71) Applicants: Kabushiki Kaisha Toshiba, Minato-u, Tokyo (JP); Toshiba Electronic Devices & Storage Corporation, Minato-ku, Tokyo (JP)

(72) Inventor: Nobuhiro Maeto, Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/213,373

(22) Filed: Dec. 7, 2018

(30) Foreign Application Priority Data

Sep. 5, 2018 (JP) ................................ 2018-166065

(51) Int. Cl.
*G11B 5/60* (2006.01)
*G11B 5/127* (2006.01)

(52) U.S. Cl.
CPC ............ *G11B 5/6082* (2013.01); *G11B 5/127* (2013.01)

(58) Field of Classification Search
CPC .......... G11B 5/60; G11B 5/6082; G11B 5/127
USPC ............................................. 360/234–234.7
See application file for complete search history.

(56) References Cited

U.S. PATENT DOCUMENTS

| | | | |
|---|---|---|---|
| 6,751,845 B2 * | 6/2004 | Gill ........................ | B82Y 10/00 29/603.07 |
| 8,711,517 B2 * | 4/2014 | Erden .................. | G11B 5/5552 360/121 |
| 9,087,527 B1 * | 7/2015 | Li ............................ | G11B 5/02 |
| 9,099,125 B1 * | 8/2015 | Hattori ................ | G11B 5/3912 |
| 9,171,558 B2 | 10/2015 | Takeo et al. | |
| 9,431,031 B1 * | 8/2016 | Xiao ......................... | G11B 5/11 |
| 9,837,106 B1 * | 12/2017 | Contreras ............ | G11B 5/3974 |
| 2014/0269234 A1 * | 9/2014 | Rivkin .................. | G11B 5/3116 369/13.17 |
| 2016/0203837 A1 | 7/2016 | Han et al. | |
| 2017/0154641 A1 | 6/2017 | Hao et al. | |
| 2017/0309300 A1 * | 10/2017 | Rudy ................... | G11B 5/3169 |
| 2017/0337941 A1 | 11/2017 | Xiao et al. | |
| 2017/0365280 A1 * | 12/2017 | Batra ............... | G11B 20/10009 |

FOREIGN PATENT DOCUMENTS

| | | |
|---|---|---|
| JP | 2013-232271 A | 11/2013 |
| JP | 2015-5319 A | 1/2015 |

* cited by examiner

*Primary Examiner* — Allen T Cao
(74) *Attorney, Agent, or Firm* — White & Case LLP

(57) ABSTRACT

According to one embodiment, a magnetic head includes a reading head including first, second, and third reading elements R1, R2, R3 which are arranged in a down track direction with intervals in an air bearing surface. A core width RW2 of the second reading element is half the width of the data track or more, and a core width RW1 of the first reading element and a core width RW3 of the third reading element are less than the core width RW2. The first reading element is opposed to one end of the second reading element and is in a position overlapping a part of an adjacent data track, and the third reading element is opposed to the other end of the second reading element and is in a position overlapping a part of an adjacent data track.

8 Claims, 6 Drawing Sheets

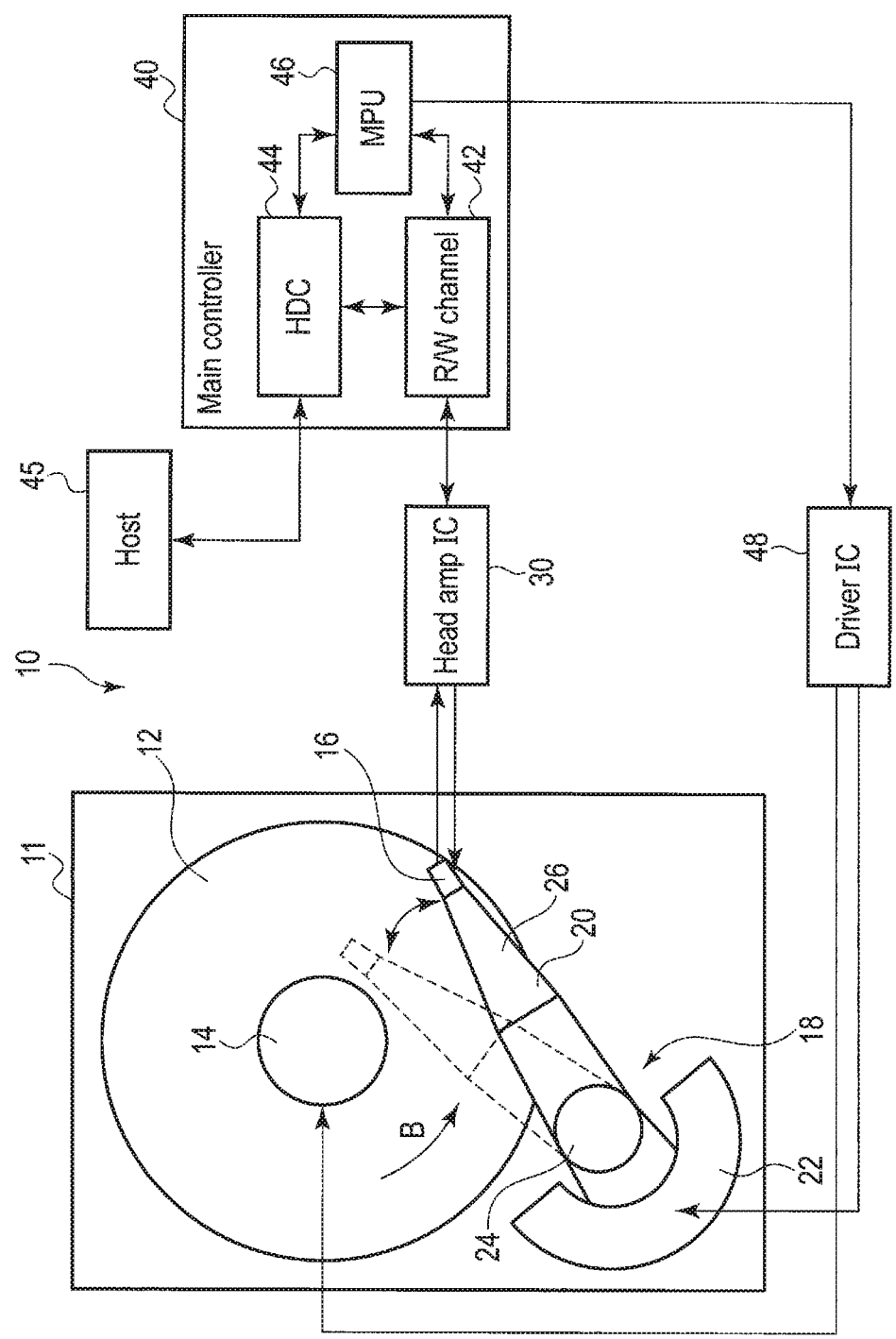
F I G. 1

MAGNETIC HEAD AND DISK DEVICE WITH THE SAME

CROSS-REFERENCE TO RELATED APPLICATIONS

This application is based upon and claims the benefit of priority from Japanese Patent Application No. 2018-166065, filed Sep. 5, 2018, the entire contents of which are incorporated herein by reference.

FIELD

Embodiments described herein relate generally to a magnetic head and a disk device with the same.

BACKGROUND

Magnetic disk drives as a disk device include a disk-shaped recording medium, i.e., a magnetic disk disposed in a case as a disk device and a magnetic head configured to read/write data from/to the magnetic disk. The magnetic head includes, for example, a recording head and reading head (reading element).

In the reading head, when a core width of the reading element is widened, a signal-to-noise (SN) ratio of reading signals is improved because of an averaging effect to media jitter. On the other hand, when the core width of the recording element is widened, a bit error rate is increased because of reading greater signals from adjacent tracks.

BRIEF DESCRIPTION OF THE DRAWINGS

FIG. 1 is a schematic block diagram of a hard disk drive (HDD) according to an embodiment.

DETAILED DESCRIPTION

Figure 2:
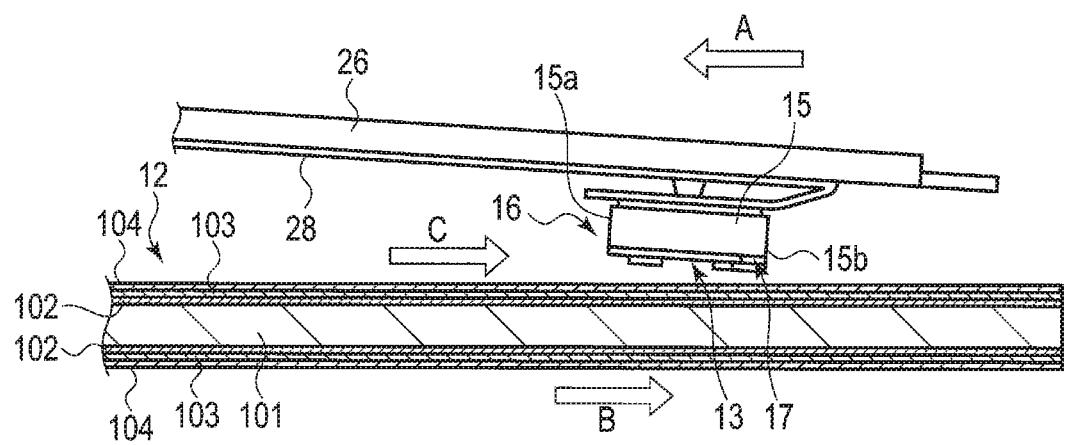
FIG. 2 is a side view showing a magnetic head, suspension, magnetic disk of the HDD.

Various embodiments will be described hereinafter with reference to the accompanying drawings. In general, according to one embodiment, a magnetic head comprises a reading head comprising a first reading element R1, a second reading element R2, and a third reading element R3; and an air bearing surface opposed to a surface of a recording medium, in which each distal end surface of the first, second, and third reading elements is exposed. Where a longitudinal direction of a data track formed in the recording medium is given a down track direction and a width direction of the data track is given a cross track direction, the first, second, and third reading elements are arranged in the down track direction in the order stated at intervals in the air bearing surface. A core width RW2 of the second reading element in the cross track direction is half the width of the data track or more, and a core width RW1 of the first reading element in the cross track direction and a core width RW3 of the third reading element in the cross track direction are formed to be less than the core width RW2 of the second reading element. The first reading element is opposed to one end of the second reading element in the cross track direction and is in a position overlapping a part of an adjacent data track, and the third reading element is opposed to the other end of the second reading element in the cross track direction and is in a position overlapping a part of an adjacent data track.

Note that the disclosure is an example, and the contents of the following description do not limit the scope of the invention. Variations which will easily be conceivable by a person having ordinary skill in the art are naturally encompassed within the scope of the invention. In the figures, dimensions of components may be depicted schematically as compared to actual models of the invention for easier understanding. Elements corresponding to each other between different figures will be referred to by the same reference number, and explanation considered redundant may be omitted.

Embodiment

A hard disk drive (HDD) according to an embodiment will be described as a disk device. FIG. 1 is a schematic block diagram showing the HDD of the embodiment, and FIG. 2 is a side view of a magnetic head in a flying state and a magnetic disk.

As shown in FIG. 1, HDD 10 comprises a rectangular casing 11, magnetic disk 12 as a recording medium disposed in the casing 11, spindle motor 21 which supports and rotates the magnetic disk 12, and a plurality of magnetic heads 16 which write/read data to/from the magnetic disk 12. Furthermore, the HDD 10 comprises a head actuator 18 which moves and positions the magnetic head 16 over a desired track on the magnetic disk 12. The head actuator 18 includes a carriage assembly 20 which movably supports the magnetic head 16 and a voice coil motor (VCM) 22 which rotates the carriage assembly 20.

The HDD 10 includes a head amp IC 30, main controller 40, and driver IC 48. The head amp IC 30 is, for example, disposed on the carriage assembly 20 and electrically connected to the magnetic head 16. The main controller 40 and the driver IC 48 are, for example, formed on a control circuit board disposed in the rear surface side of the casing 11, which is not shown. The main controller 40 comprises a R/W channel 42, hard disk controller (HDC) 44, and microprocessor (MPU) 46. The main controller 40 is electrically connected to the magnetic head 16 via the head amp IC 30. The HDC 44 is connectable to a host computer 45.

As shown in FIGS. 1 and 2, the magnetic disk 12 is structured as a vertical magnetic recording medium. The magnetic disk 12 includes, for example, a substrate 101 formed as a disk having a diameter of 88.9 mm (3.5 inch) and of a nonmagnetic substance. On each surface of the substrate 101, a soft magnetic layer 102 as an underlying layer, magnetic recording layer 103, and protection film 104 are layered in this order. The magnetic disk 12 is coaxially engaged with a hub of the spindle motor 21. The magnetic disk 12 is rotated by the spindle motor 21 in direction of arrow B at a certain rate.

The carriage assembly 20 includes a bearing 24 unit rotatably supported on the casing 11 and a plurality of suspensions 26 extending from the bearing unit 24. As shown in FIG. 2, the magnetic head 16 is supported by an extending end of each suspension 26. The magnetic head 16 is electrically connected to the head amp IC 30 via a wiring member (flexure) 28 provided on the carriage assembly 20.

As shown in FIG. 2, the magnetic head 16 is structured as a flying head which includes a substantial parallel-piped slider 15 and a head element 17 formed in the slider 15 in an out-flow end (trailing) side. The slider 15 is formed of a sinter of alumina and titan carbide (altic), and the head element 17 is formed of layered thin films.

The slider 15 includes a rectangular disk facing surface (medium facing surface, or air bearing surface (ABS)) 13 opposed to the surface of the magnetic disk 12. The slider 15 is maintained to fly above the surface of the magnetic disk 12 with a certain gap therebetween because of air current C produced by the rotation of the magnetic disk 12 between the disk surface of the magnetic disk 12 and the ABS 13. The direction of air current C matches rotation direction B of the magnetic disk 12. The slider 15 comprises a leading end 15a positioned in the in-flow side of the air current C and a trailing end 15b positioned in the out-flow side of the air current C. In accordance with the rotation of the magnetic disk 12, the magnetic head 16 runs in the direction of arrow A (head running direction) over the magnetic disk 12, that is, in the opposite direction to the rotation direction B of the disk.

Figure 3:
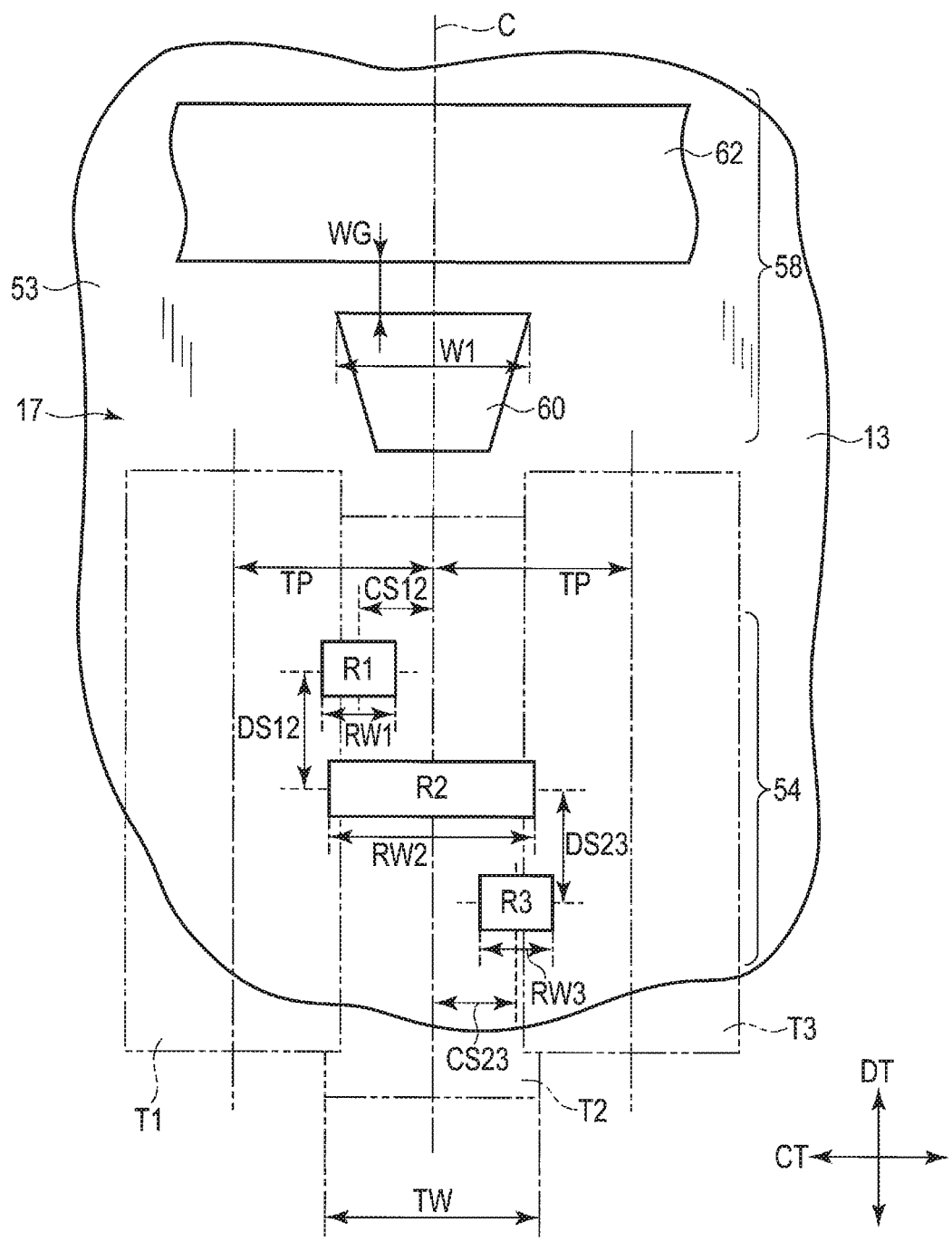
FIG. 3 is a plan view of a head element of the magnetic head, viewed from an ABS side.

FIG. 3 shows a head element of the magnetic head, as being viewed from the ABS side in an enlarged manner. The head element 17 of the magnetic head 16 is a separate-type magnetic head. The head element 17 comprises a reading head (reproducing head) 54 and a recording head 58 which are formed on the trailing end 15b of the slider 15 through a thin film process. The reading head 54 and the recording head 58 are covered with a nonmagnetic protection insulating film 53 except for the part exposed to the ABS 13 of the slider 15. The protection insulating film 53 forms the exterior of the head element 17.

The recording head 58 is provided at the trailing end 15b side of the slider 15 as compared to the reading head 54. The recording head 58 comprises a main magnetic pole 60 which generates a recording magnetic field perpendicular to the ABS 13, a write shield 62 opposed to the main magnetic pole 60 with a write gap WG therebetween, and a recording coil wrapped around a magnetic core formed by the main magnetic pole 60 and the write shield 62, for example. The main magnetic pole 60 is formed of a soft magnetic material with high magnetic permeability and high saturation magnetic flux density, and the distal end thereof is exposed to the ABS 13. The write shield 62 is formed of a soft magnetic material and the distal end thereof is exposed to the ABS 13. The main magnetic pole 60 and the write shield 62 are arranged on the long axis (center axis line C) of the slider 15 side-by-side. In FIG. 3, a longitudinal direction of the recording track is given a down track direction DT and a width direction of the recording track is given a cross track direction CT. The slider 15 is positioned such that the center axis line C extends in the down track direction DT with respect to the magnetic disk 12. The distal end portion of the main magnetic pole 60 has a width (width in the cross track direction CT) W1 which is set to be equivalent to or less than a width T of the recording track of the magnetic disk 12.

As shown in FIG. 3, the reading head 54 is provided on the leading side of the recording head 50, that is, on the in-flow side. The reading head 54 comprises a plurality of reading elements designed for two dimensional magnetic recording (TDMR). In the present embodiment, the reading head 54 comprises first, second, and third reading elements (readers) R1, R2, and R3. Each of the reading elements R1, R2, and R3 is, for example, a tunneling magneto resistive element. A tunneling magneto resistive element includes, generally, a magnetization pinned layer (pin layer) (first magnetic substance layer) and a magnetization free layer (free layer) (second magnetic substance layer) layered with an insulating layer interposed therebetween. Note that, although this is not shown, electrodes or electrode films to supply the electricity to the reading elements are provided above and below the reading elements. The rectangular distal end surface of the magnetic core is exposed to the ABS 13 and is substantially flush with the ABS 13.

In the ABS 13, the first to third reading elements R1, R2, and R3 are arranged in this order in the down track direction DT from the recording head 58 side to the leading end side at certain intervals. Each of the reading elements R1, R2, and R3 is arranged such that the longitudinal direction thereof is parallel to the cross track direction CT, that is, is arranged in a direction orthogonal to the down track direction DT. Thus, the first to third reading elements R1, R2, and R3 are arranged to be parallel to each other.

The second reading element R2 which tracks on the data track T2 as a reading target is formed such that a core width RW2 in the cross track direction CT is widened to be half a track width TW of the data track T or more. The first reading element R1 and the third reading element R3 positioned on both sides of the second reading element R2 (both sides of the down track direction) are formed such that the core widths and element positions thereof are optimized to read signals of adjacent data tracks T1 and T3 picked up by the second reading element R2.

Specifically, the core width RW1 of the first reading element R1 and the core width RW3 of the third reading element R3 are formed to be smaller than the core width RW2 of the second reading element R2, and for example, are formed to be 30 to 70% of the core width RW2, or preferably, are formed to be 40 to 60% of the core width RW2. The first reading element R1 is opposed to one end portion of the second reading element R2 in the core width direction and is disposed in a position overlapping the side edge of the adjacent data track T1. The third reading element R3 is opposed to the other end portion of the second reading element R2 in the core width direction and is disposed in a position overlapping the side edge of the adjacent data track T3. In the present embodiment, the first reading element R1 and the third reading element R3 are formed and arranged to be symmetrical with respect to the center of the second reading element R2.

When the signals are read by the reading head 54 in which the first to third reading elements R1, R2, and R3 are arranged in the down track direction DT in this order, the second reading element R2 is arranged over the data track T2 as a reading target and the first reading element R1 and the third reading element R3 are arranged over the adjacent data tracks T1 and T3. In that case, adjacent signal eliminating effects caused by skew angles are, preferably, set similar in the tracks in the cross track direction CT, that is, effects of the first reading element R1 and the third reading element R3 are, preferably, set similarly. Thus, intervals CS in the cross track direction CT and intervals DS in the down track direction DT are set to be similar between the first and third reading elements R1, R3 with the second reading element R2 as the center.

In FIG. 3, a track pitch in the cross track direction CT of data tracks T1 to T3 is given TP, a gap between centers of a reading element x and a reading element y in the cross track direction CT is given CSxy, and a gap between centers of a reading element x and a reading element y in the down track direction is given DSxy.

In the present embodiment, the reading head 54 is set as follows.

$$TP \times 0.1 < (RW1 \text{ and } RW3) < TP \times 0.4,$$

$$TP \times 0.6 < RW2 < TP \times 1.2,$$

$$TP \times 0.1 < CS12 < TP \times 1.0,$$

$$DS12 > 0,$$

CS12 and CS23 are symmetry with respect to the second reading element R2 and are apart from the second reading element R2 with substantially the same gap, DS12 and DS23 are symmetry with respect to the second reading element R2 and are apart from the second reading element R2 with substantially the same gap, and RW1 and RW3 are substantially half RW3.

Figure 4:
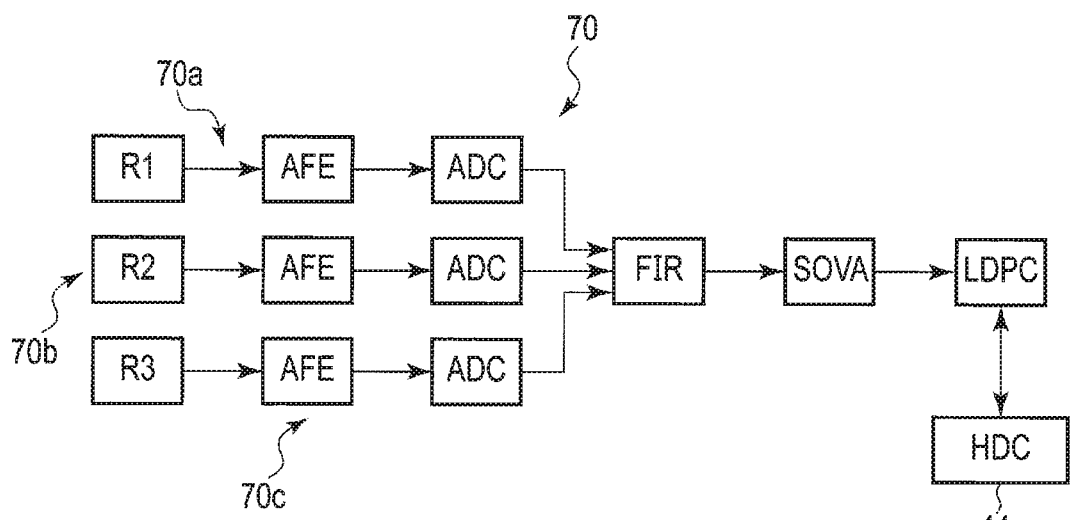
FIG. 4 is a block diagram showing an example of an equivalent circuit of the HDD.

FIG. 4 shows a signal processing circuit (equivalent circuit) which processes read signal wave forms from the first to third reading elements R1, R2, and R3 in a two-dimensional manner. An equivalent circuit 7 is disposed in the R/W channel 42 and includes three systems of a first system 70a for the first reading element R1, second system 70b for the second reading element R2, and third system 70c for the third reading element R3. Each of the systems 70a, 70b, and 70c includes an analogue front end (AFE) and an AD converter (ADC). Outputs from three ADCs of the three systems are synthesized and sent to a low density parity check (LDPC) code via a finite impulse response (FIR) circuit and a soft output Viterbi algorithm (SOVA).

Signals read by the first to third reading elements are sampled by the ADC through the AFE. Each signal is subjected to a two-dimensional equalization process by the FIR. Then, the signals are subjected to a decoding process through the SOVA and the low density parity check code, and are sent to the HDC 44.

With the above magnetic head 16 including the reading head 54 structured as above, the signals of a target data track T2 can be widely read by the second reading element R2, and a signal-to-noise ratio (SNR) of read signals can be improved by an averaging effect of media jitter. At the same time, with the first and third reading elements R1 and R3 each having a core width to read signals of adjacent data tracks picked up by the second reading element R2, an adjacent signal removing effect can be achieved effectively in the read signal process of the TDMR, and an excellent bit error rate (BER) can be achieved.

Figure 5:
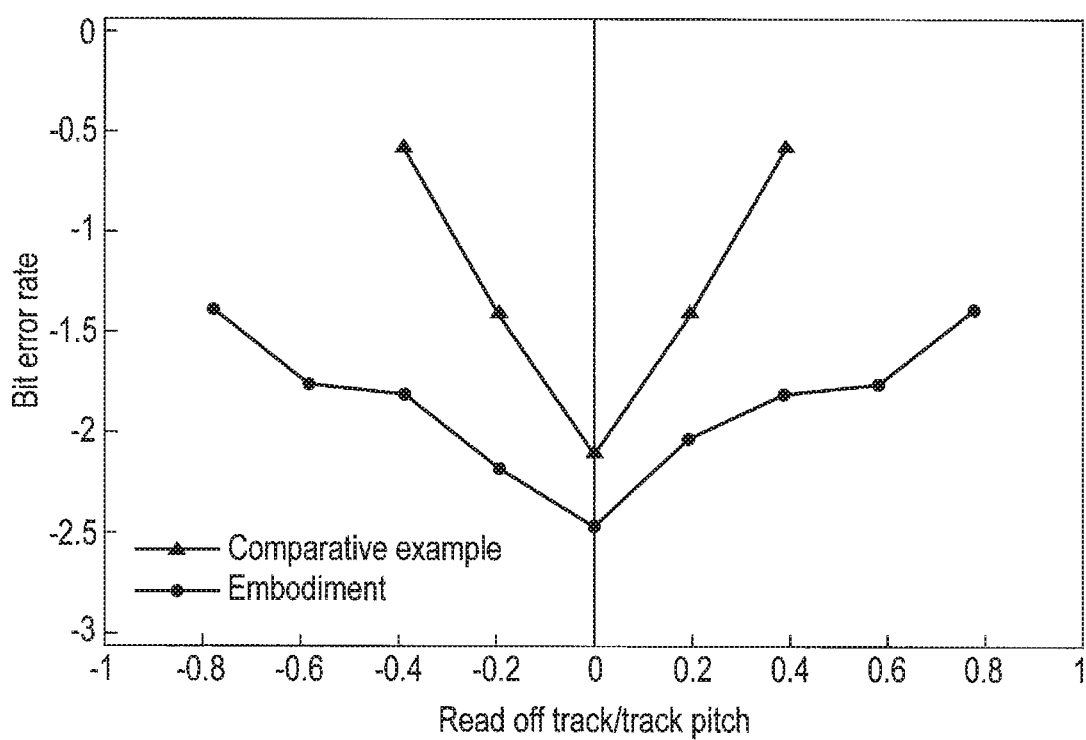
FIG. 5 shows a comparison of a position in track pitch direction and bit error rate between the magnetic head and a magnetic head of a comparative example.

FIG. 5 shows comparison of bit error rates at some positions in the track pitch direction between the reading head 54 of the present embodiment and a reading head of a comparative example. Note that the reading head of the comparative example includes three reading elements having a common core width arranged in the down track direction. In FIG. 5, the core width RWx and the gap CSxy in the cross track direction CT are standardized by a track pitch. For example, in the reading head of the present embodiment, (RW1, RW2, RW3)=(0.35, 0.7, 0.35), (CS12, CS23)=(−0.6, 0.6). In the reading head of the comparative example, (RW1, RW2, RW3)=(0.5, 0.5, 0.5), (CS12, CS23)= (0, 0).

As shown in FIG. 5, in the reading head 54 of the present embodiment, the bit error rate of the read signals is greatly improved as compared to the reading head of the comparative example through the averaging effect of media jitter and adjacent signal removing effect.

Figure 6:
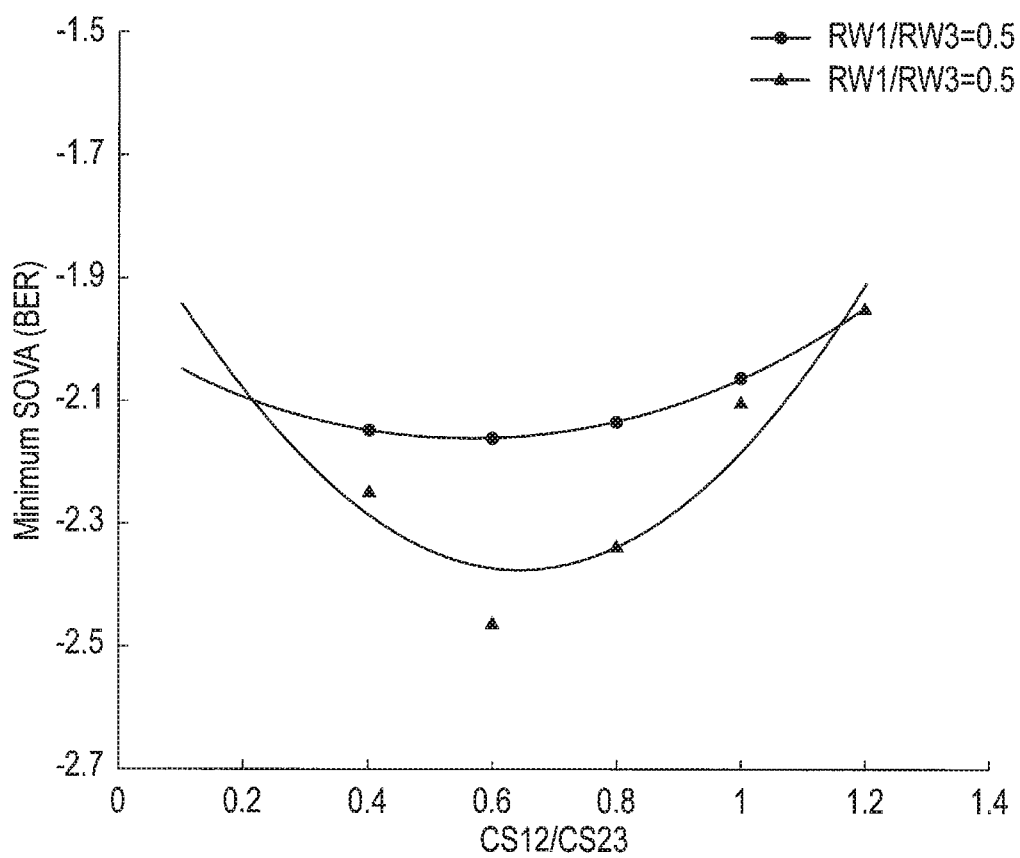
FIG. 6 shows a relationship between a core width and a cross track direction position, and bit error rate of first and third reading elements.

FIG. 6 shows an influence degree to the bit error rate by the RW1/RW3 and CS12/CS23. In the figure, RW2=0.75, and the vertical axis indicates the minimum bit error rate (BER) when a read off track is shaken. The RW1/RW3 have an optimize point in 0.4 or less, and the CS12/CS23 have an optimize point between 0.4 and 0.8.

Figure 7:
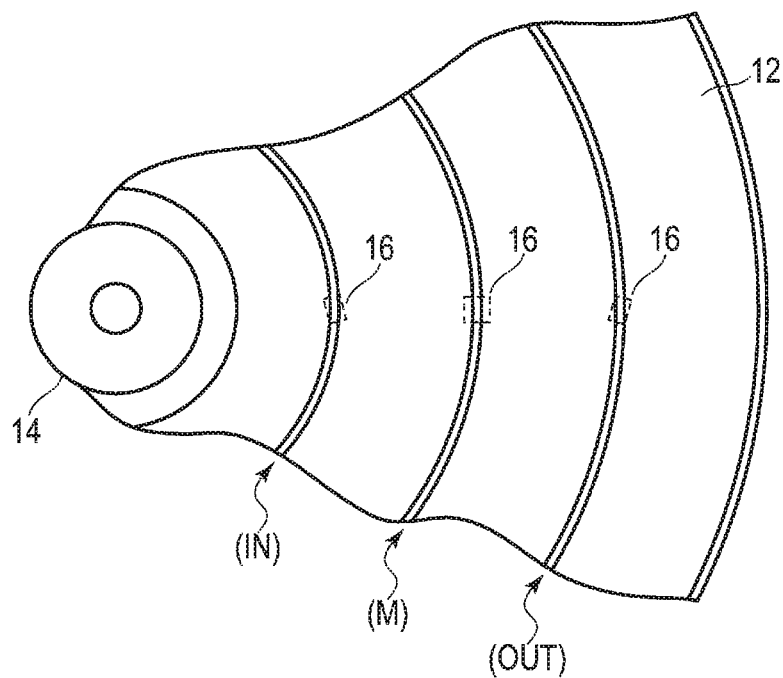
FIG. 7 is a plan view schematically showing a position of the magnetic head with respect to the magnetic disk of the HDD of the embodiment.
Figure 8:
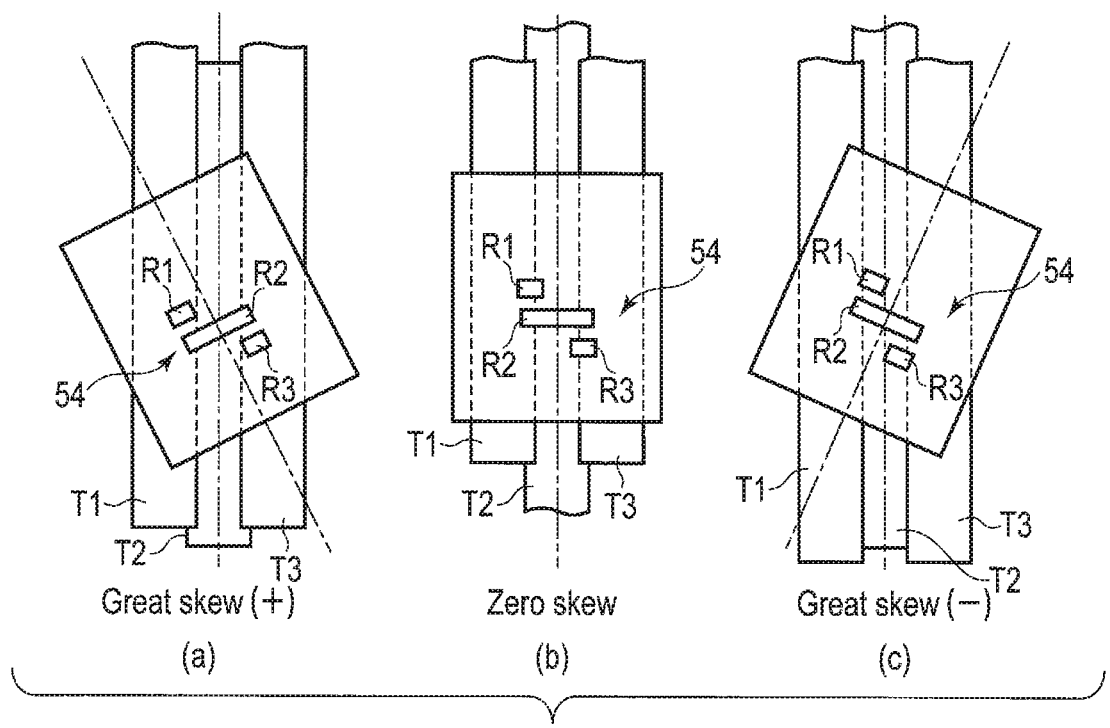
FIG. 8 is a plane view schematically showing positional relationships between the reading head of the HDD and the data track at a plurality of skew angles.

As shown in FIGS. 7 and 8, a position (offset amount) of the reading element changes in accordance with a position of the magnetic head 16 in a radial direction with respect to the magnetic disk 12, that is, a skew angle of the magnetic head 16 with respect to the data track T. For example, when the magnetic head 16 is positioned in the inner peripheral side (IN), middle part (M), and the outer peripheral side (OUT) in the radial direction of the magnetic disk 12, respectively, the skew angle of the magnetic head 16 becomes great (+), zero, and great (−), respectively. In the reading head 54 of the present embodiment, the first and third reading elements R1 and R3 are, with the second reading element R2 centered therein, arranged in the cross track direction CT and the down track direction DT at substantially the same interval. Thus, the second reading element R2 overlaps the data track T of resuming target in each of the skew angles of great (+), zero, and great (−), and the first and third reading elements R1 and R3 are positioned over the adjacent data tracks. Thus, even if a skew angle is recognized on the magnetic head 16, as described above, the signal-to-noise ratio (SNR) of the resuming signals can be improved by the averaging effect of media jitter, and the adjacent signal removing effect can be achieved effectively by the resuming signal processing of the TDMR, and thus, an excellent bit error rate (BER) can be achieved.

In the present embodiment, the core width of each of the first and third reading elements R1 and R3 is formed to be half the core width of the second reading element R2. Furthermore, the first and third reading elements R1 and R3 are arranged to not overlapping with each other in the down track direction DT, and the second reading element R2 is arranged between the first and third reading elements R1 and R3 in the down track direction DT. Thus, the reading head can be easily manufactured, and the averaging effect of media jitter and the adjacent signal removing effect can be achieved at any skew angle of the magnetic head.

As can be understood from the above, in the present embodiment, a magnetic head which can remove an influence of adjacent track signals and can improve the quality of read signals and a disk device comprising the magnetic head can be achieved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, in the reading head, the first reading element R1 and the third reading element R3 are arranged to be symmetrical with respect to the second reading element R2, and the first reading element R1 and the third reading element R3 may be switched in the cross track direction. The number of the reading elements may not be three, and may be four or more.

The magnetic head of the present embodiment may be applied to a shingled magnetic recording (SMR). In the SMR, a relationship between the remaining data tracks and the core width of the reading elements is the same as in the above-described embodiment. Thus, when the track pitch is narrowed by 16% or the like in the SMR, for example, the reading head is structured as follows with respect to the SMR.

$$(RW1 \text{ and } RW3) < TP \times 0.464,$$

$$RW2 > TP \times 0.696, \text{ and}$$

$$CS12 > TP \times 0.116$$

In addition, the material, shape, size of each element of the disk device may be arbitrarily changed if necessary.

What is claimed is:

1. A magnetic head comprising:
    a reading head comprising a first reading element R1, a second reading element R2, and a third reading element R3; and
    an air bearing surface opposed to a surface of a recording medium, in which each distal end surface of the first, second, and third reading elements is exposed, wherein,
    where a longitudinal direction of a data track formed in the recording medium is given a down track direction, a width direction of the data track is given a cross track direction, and a track pitch of data tracks in the width direction is given TP,
    the first, second, and third reading elements are arranged in the down track direction in the order stated at intervals in the air bearing surface,
    a core width RW2 of the second reading element in the cross track direction satisfies the following: $TP \times 0.6 < RW2 < TP \times 1.2$,
    a core width RW1 of the first reading element in the cross track direction and a core width RW3 of the third reading element in the cross track direction are formed to be less than the core width RW2 of the second reading element,
    the first reading element is opposed to one end of the second reading element in the cross track direction and is in a position overlapping a part of an adjacent data track, and
    the third reading element is opposed to the other end of the second reading element in the cross track direction and is in a position overlapping a part of an adjacent data track.

2. The magnetic head of claim 1, wherein
    the core width RW1 of the first reading element R1 and the core width RW3 of the third reading element R3 are formed to be 30 to 70% of the core width RW2 of the second reading element R2.

3. The magnetic head of claim 1, wherein
    the first reading element R1 and the third reading element R3 are symmetrical with respect to a center of the second reading element R2 in the cross track direction.

4. The magnetic head of claim 1, wherein,
    where a gap between the centers of reading elements in the cross track direction is given CSxy, and a gap between central axis lines of the reading elements in the down track direction is given DSxy, the first, second, and third reading elements R1, R2, and R3 are formed and arranged to satisfy the followings;

$$TP \times 0.1 < (RW1 \text{ and } RW3) < TP \times 0.4,$$

$$TP \times 0.1 < CS12 < TP \times 1.0,$$

$$DS12 > 0,$$

$$CS23 = CS12, \text{ and}$$

$$DS23 = DS12.$$

5. A disk device comprising:
    a rotatable disk-shaped recording medium with a magnetic recording layer; and
    a magnetic head of claim 1 configured to process data with respect to the magnetic recording layer.

6. The disk device of claim 5, wherein
    the core width RW1 of the first reading element R1 and the core width RW3 of the third reading element R3 are formed to be 30 to 70% of the core width RW2 of the second reading element R2.

7. The disk device of claim 5, wherein
    the first reading element R1 and the third reading element R3 are symmetrical with respect to a center of the second reading element R2 in the cross track direction.

8. The disk device of claim 5, wherein,
    where a gap between the centers of reading elements in the cross track direction is given CSxy, and a gap between central axis lines of the reading elements in the down track direction is given DSxy, the first, second, and third reading elements R1, R2, and R3 are formed and arranged to satisfy the followings;

$$TP \times 0.1 < (RW1 \text{ and } RW3) < TP \times 0.4,$$

$$TP \times 0.1 < CS12 < TP \times 1.0,$$

$$DS12 > 0,$$

$$CS23 = CS12, \text{ and}$$

$$DS23 = DS12.$$

* * * * *